United States Patent [19]

Maier-Laxhuber et al.

[11] Patent Number: 4,956,977
[45] Date of Patent: Sep. 18, 1990

[54] ADSORPTION APPARATUS USED AS AN ELECTRO-HEATING STORAGE

[76] Inventors: Peter Maier-Laxhuber, Saumweberstrabe 14, D-8000 Munchen 60; Fritz Kaubek, Gasparistrabe 5 A, D-8000 Munchen 71, both of Fed. Rep. of Germany

[21] Appl. No.: 233,269

[22] Filed: Aug. 17, 1988

Related U.S. Application Data

[62] Division of Ser. No. 695,484, Jan. 28, 1985, Pat. No. 4,802,341.

[30] Foreign Application Priority Data

Apr. 9, 1984 [DE] Fed. Rep. of Germany ....... 3413349

[51] Int. Cl.$^5$ ............................................. F25B 17/00
[52] U.S. Cl. .................................... 62/106; 62/235.1; 62/476
[58] Field of Search ..................... 62/263, 262, 238.3, 62/298, 476, 477, 235.1, 106, 101; 237/2 B

[56] References Cited

U.S. PATENT DOCUMENTS 3,404,539 10/1968 Laing ................................. 62/263 X
4,003,213 1/1977 Cox .
4,169,362 10/1979 Weil et al. .
4,479,364 10/1984 Maier-Laxhuber .
4,532,778 8/1985 Clark et al. .

FOREIGN PATENT DOCUMENTS 3207656 3/1982 Fed. Rep. of Germany .
3212608 10/1983 Fed. Rep. of Germany .

*Primary Examiner*—Henry A. Bennett
*Attorney, Agent, or Firm*—Hoffmann & Baron

[57] ABSTRACT

Periodic adsorption apparatus with the substance pair zeolite/water being used as electro-heat storage devices. Due to the heat pumping effect there can be a 30% savings of power.

8 Claims, 1 Drawing Sheet

ADSORPTION APPARATUS USED AS AN ELECTRO-HEATING STORAGE

This is a divisional of co-pending application Ser. No. 695,484 filed on Jan. 28, 1985 U.S. Pat. No. 4,802,341.

Background of the Invention

The invention relates to an adsorption apparatus with heat pumping effect used as an electro-heating storage.

In order to smooth the severely fluctuating current use, electro-heat storages are employed. When rates for electrical current are economically favorable, typically a storage material, like ceramic, cast iron, oil or water is heated, for example, during the charge phase. The stored heat is fed to the consumer via suitable heat removing systems during the subsequent discharging phase. Night time current storages are in use for heating individual rooms and central heat storages which supply a plurality of consumers from one location through a heat distribution system. In order to keep the space requirement for the electro-heat storages as low as possible, the storage materials are partially heated to a temperature above 900° C. Undesirable heat losses must be prevented with expensive insulation measures. A heat pumping effect with a corresponding energy saving is not possible with these devices.

Zeolites are solid alumini-silicates with a uniform crystal structure. Adsorption zeolites have the characteristics of being able to adsorb a considerable amount of water in its crystal structure. Heat is released during this adsorption. In order to again desorb the water, heat must be used.

Heat storage installations with the adsorption pair of zeolite/water are suggested in German laid open patent applications P 32 07 656 and P 32 12 608. When the rates for electrical current are low steam is desorbed from the absorption zeolith and liquified in a condenser. The condensated steam is again evaporated at a later time by absorbing ambient heat and adsorbed in the adsorption substance by releasing heat at high temperatures. The control of such installations is only possible by a plurality of valves or check valves with corresponding control units. This control effort is not economical with small electro-heat storages despite a 30% saving of energy.

Summary of the Invention

It is, therefore, an object of the invention to use periodic adsorption processes as electro-heat storages and to save energy by means of available pump effect.

The adsorption electro-heat storage in accordance with the invention consists of the conventional parts electro heating, heat removal system and control, on the one hand, and the adsorption part, on the other hand. The adsorption part consists of two containers which are connected by means of a steam line; namely the adsorption substance container which in the conventional part of the electro-heat storage replaces the storage material and the collecting container for condensate. A steam line leads from the containers to a condenser and a water cycle leads to a heat collector. The water cycle contains a pump. The mode of operation is divided into two phases;

(a) charging phase - the adsorption substance container is heated to 200°-300° C. by means of the electro-heater. Thereby, steam is desorbed from the adsorption substance which is liquified in the condenser and flows as a condensate into the collecting container. The condensation heat is discharged as an operating heat at temperatures up to 100° C.;

(b) discharge phase - the electro-heater is out of operation. Heat is removed from the adsorption substance container through the conventional heat removal system. Condensate evaporates in the collecting container during lower steam pressures and cools the remaining water. The steam is exothermically adsorbed by the adsorption substance at high temperatures. The adsorption heat can be removed through the heat removal system if so desired. The pump of the water cycle feeds cooled residue condensate through the heat collector. So that the water cycle does not dissipate heat to the heat collector, a control unit actuates the pump only when the temperature in the heat collector is higher than the condensation temperature in the collecting container. Moreover, the operation of the pump may be made dependent from other criteria through this control unit. For example, the pump may only be operated after a certain temperature had been exceeded in the heat collector.

This process can be advantageously used for safety against frost or for maintaining a certain temperature of the exhaust heat (for example, waste water, cooling air).

The possibility exists in conventional electro-heat storages for room heating to aftercharge the heating storage with current during the daytime on extremely cold days. Since during these very cold days the heat reception through the heat collector may be limited, an aftercharge is advantageously transmitted to the system through an electrical heater in the collecting container. Thereby, the heat dissipation capacity from the adsorption electro-heating storage increases by about 30% with respect to the aftercharge capacity, since the adsorption of the steam in the adsorption substance releases the chemically stored adsorption heat.

The adsorption electro-heat storage in accordance with the invention can be advantageously integrated into a tile hearth. In this case, hot combustion gases take over the desorption operation from case to case. In this manner, the tile hearth can store more heat and recover additional heat through the heat collector. The cooling time of the tiled hearth is prolonged.

A further advantageous possibility of use is the coupling of an adsorption electro-heat storage with a hot water storage. The adsorption part recovers additional heat through the heat pumping effect from the air or the waste water and permits a small structural size of the water storage. The use of night current is also advantageous for the utility company during the summer time.

Adsorption apparatuses operate at least partially under vacuum conditions. A sufficient tightness of the system is the basic requirement for a smooth operation. It is therefore suggested to assemble the adsorption part as a compact, finished apparatus part by the manufacturer. When using the heat collector as an outside absorber, it must be pushed through the building wall to the outside, while the remainder of the device components remain within the building. For this purpose, a wall box is built into the building wall which is closed with a suitable insulation element during the installation of the device. This insulation element fixed the heat collector to the outside and leaves room on the inside for the flexible condensation lines to the collecting container.

In a further advantageous development the insulation element is provided with a ventilation system which feeds hot exhaust air from the building to the outside positioned heat collector for recovery.

The zeolite types Na-A, Mg-A, Na-Y, H-Y and Na-X have been shown to be useful as adsorption substances. They have very good adsorption characteristics for water in addition to a sufficient temperature and cycle stability.

The condensate in the collecting container may freeze due to the evaporation operation. The latent heat which is thereby released can be additionally used for the adsorption heat in the adsorption substance during increased temperatures. In a sufficiently large dimensioned collecting container, the total evaporation enthalphy may be supplied by the latent conversion heat. The ice which is generated in the discharge phase is again molten during the condensation heat. About 1.3 Kilogram water is required per Kilogram of adsorption substance.

If no conversion heat is to be used and when heat is coupled in through the heat collector from the environment at temperatures below 0° C., an antifreeze agent may be added to the water. Suitable substances are salts or lyes which have a low steam pressure.

If only ambient heat is collected above 0° C., no antifreeze agents are required. The heat collector may be installed above the maximum water level in the collecting container, so that the heat collector does not freeze during the frosty weather. The water would then return into the collecting container when the pump is in the rest position. A water syphon in the water cycle prevents a condensation of steam in the heat collector during the charge phases and also prevents a loss of heat to the outside.

The described adsorption electro-heat storage does not contain any valves and requires only a small control effort for the control of the pump. The costs for power are lower by about 30% with respect to the conventional systems. The electrical connecting line is reduced by about one third.

Ventilation heat losses can be reduced by a simple heat recovery of the exhaust air. Since all components of a conventional electro-heat storage can be used, with the exception of the storage material, only a small amount of additional cost is incurred. A heat pumping installation with heat recovery possibilities is obtained from a pure heat storage device with a favorable control. During the discharge phase the new system is always ready to absorb ambient heat, in contrast to other heat pumping systems, no matter how high the temperatures and amounts are. Even the smallest heat amounts can be used without limitation.

BRIEF DESCRIPTION OF THE DRAWINGS

Exemplified embodiments of the invention are illustrated in the drawing and are described in more detail in the following. In the drawings.

DETAILED DESCRIPTION OF THE PREFERRED EMBODIMENTS

Figure 1:
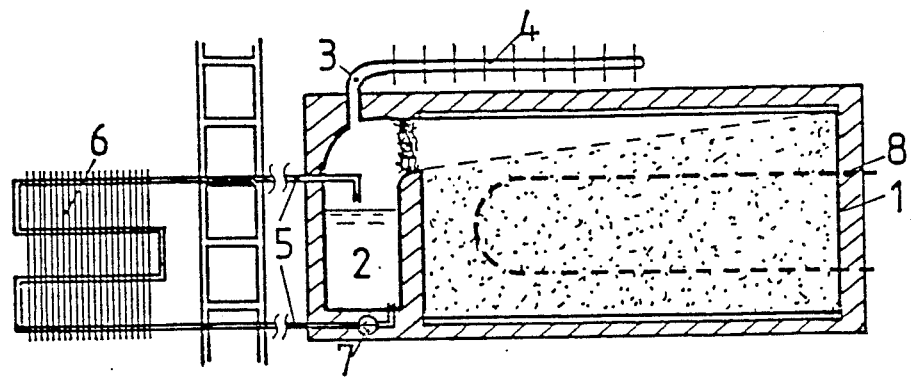
FIG. 1 - an adsorption electro-heat storage for room heating.

FIG. 1 shows an adsorption substance container 1 on which a small collecting container 2 is connected. From there, a steam line 3 leads to a condenser (4) and two flexible liquid lines 5 leads to a heat collector 6. The associated water cycle contains a pump 7. The operation is divided into two phases:

a. Charge Phase

The adsorption substance container is heated to a temperature of 250°–300° C. by means of electric heating rods 8. During this time water is evaporated from the adsorption substance. The steam can condense in condensator 4 and dissipate heat to the room air. The condensate flows into the collecting container 2 and remains there until the discharge phase.

b. Discharge Phase

The adsorption substance container is cooled by the air flow. During a lowering of the adsorption substance temperature there is also a lowering of the steam pressure in the containers. Water from the collecting container gets cold and the adsorption substance hot. Whenever the water temperature in the collecting container 2 falls below the outer temperature pump 7 pumps water through the heat collector. The cold water absorbs heat from the outer air and transfers it to the evaporating water in the collecting container 2.

Figure 2:
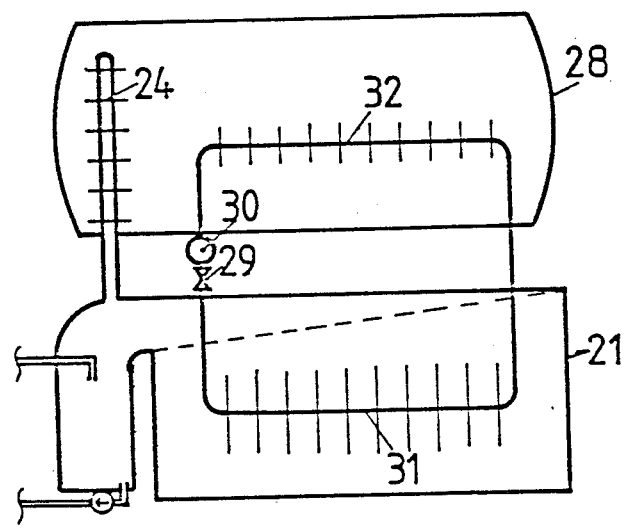
FIG. 2 - an adsorption electro-heat storage in combination with a hot water storage.

FIG. 2 shows a combination of an adsorption electro-heat storage with a hot water storage. Condenser 24 is mounted within the hot water storage 28. During the charging phase the condenser dissipates the condensation heat to the water storage 28. During the discharge phase the operating heat is transferred from the adsorption substance container 21 through a water-steam-system to the water. When the storage water is too cold, the valve 29 opens. Water flows from container 30 to the evaporator 31 and evaporates therein. The steam dissipates the condensation heat in the liquefier 32. The condensate again collects in container 30.

Thus, the several aforementioned objects and advantages are most effectively attained. Although several somewhat preferred embodiments have been disclosed and described in detail herein, it should be understood that this invention is in no sense limited thereby and its scope to be determined by that of the appended claims.

We claim:

1. A process for operating a periodic adsorption apparatus for use as an electro-heat storage provided with a heat pumping effect, said periodic adsorption apparatus being characterized by a charge phase and a discharge phase of operation, said process comprising the steps: during said charge phase of operation,
   (a) desorbing water from an adsorption substance contained in an adsorption substance container, employing heat produced from a heat producing source so as to produce vapor;
   (b) liquifying said vapor into water using a condenser thereby liberating condensation heat; and
   (c) discharging said condensation heat as operating heat and collecting said water in a collecting container; and during said discharge phase,
   (d) removing heat from said adsorption substance so that thereupon a portion of said water in said collecting container evaporates and is exothermically absorbed in said adsorption substance, while a residual portion of said water remains in said collecting container; and
   (e) pumping said residual portion of water through a heat collector using a pump, so that said residual portion of water in said heat collector absorbs heat from a heat flow presented in a heat exchanging relationship with said heat collector.

2. The process in accordance with claim 1, wherein step (e) further comprises using a control unit to enable said pump to commence pumping said residual portion of water through said heat collector at a time when the temperature in said heat collector is higher than the temperature of said residual portion of water in said collecting container.

3. The process in accordance with claim 2, wherein step (e) further comprises enabling the operation of said pump only after the temperature of said heat collector reaches a preselected temperature value.

4. The process in accordance with claim 1, wherein step (e) further comprises:
   pumping said residual portion of water through said heat collector which is connected in fluid communication with said collecting container and said pump through a water cycle, said heat collector being capable of exchanging heat from a supply of waste water to said water cycle, and
   transferring heat from said waste water to said water cycle.

5. The process in accordance with claim 1, wherein step (d) further comprises, during said discharge phase, temporarily heating said water in said collecting container using an electric heating device.

6. The process in accordance with claim 1, which further comprises prior to step (a), installing said adsorption substance container in an integrated manner in a tile hearth capable of producing heat containing combustion gases, and wherein step (b) further comprises desorbing water from said adsorption substance using the heat provided by said heat containing combustion gases.

7. The process in accordance with claim 1, wherein step (c) process further comprises:
   heating said water in a hot water storage using said condensation heat, and wherein step (d) comprises using a water-steam system to discharge the heat liberated from said adsorption substance, for heating and evaporating a portion of said water during said discharge phase of operation.

8. The process in accordance with claim 4, wherein prior to step (e), said process further comprises providing heat containing exhaust air to said heat collector, and transmitting the heat content of said exhaust air through said water cycle into said collecting container.

* * * * *